Sept. 18, 1923.

H. O. HEM

WEIGHING SCALE

Filed Aug. 15, 1918

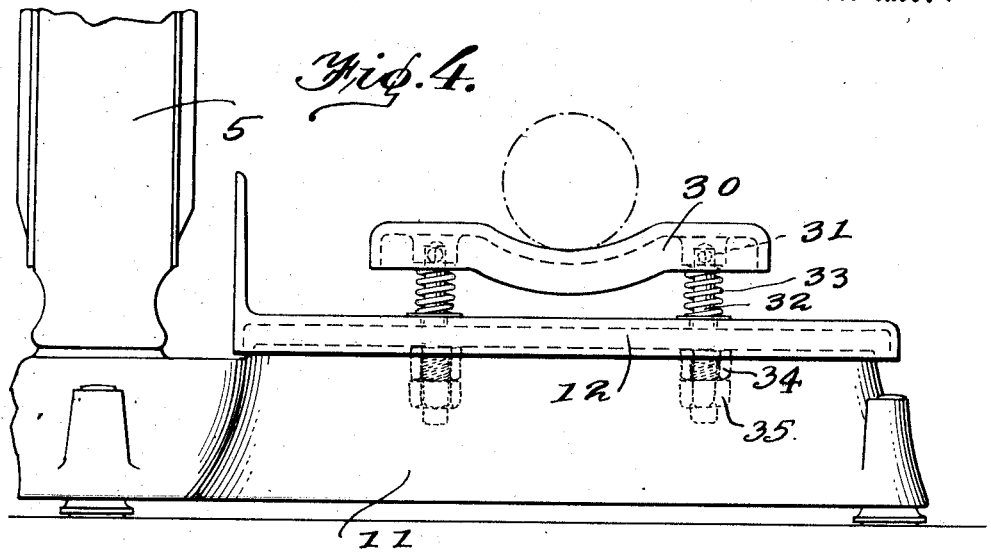
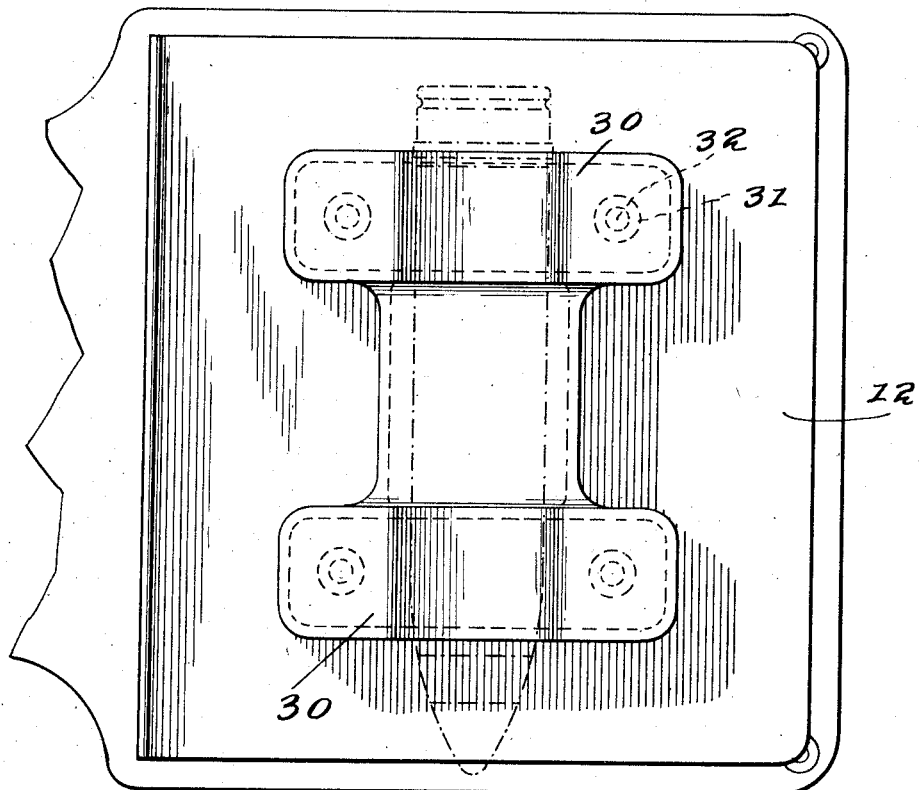

Sept. 18, 1923.
H. O. HEM
WEIGHING SCALE
Filed Aug. 15, 1918
1,468,020
4 Sheets-Sheet 4
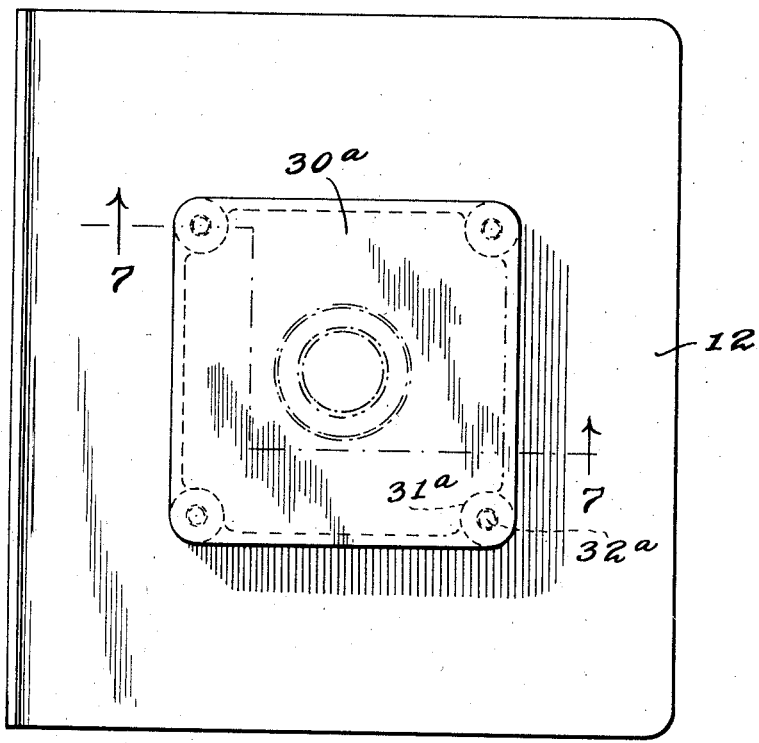
Fig. 6.
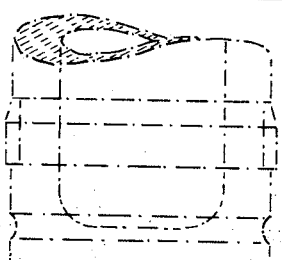
Fig. 7.
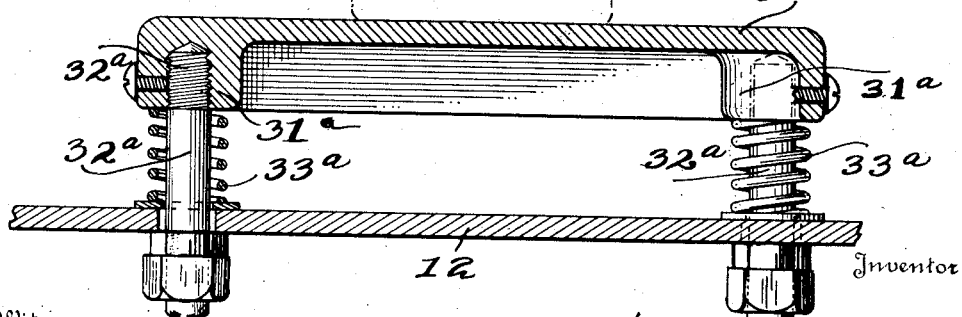

Patented Sept. 18, 1923.

1,468,020

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed August 15, 1918. Serial No. 249,972.

*To all whom it may concern:*

Be it known that I, HALVOR O. HEM, a citizen of the United States, residing at Toledo, in the county of Lucas and State of Ohio, have invented certain new and useful Improvements in Weighing Scales, of which the following is a specification.

This invention relates to weighing scales, and is especially designed for weighing munitions, shells and heavy metallic parts thereof to enable an accurate check to be maintained on the weight of the shell and parts as they progress from one operation to another in the course of manufacture. With the high speed production methods now in vogue in our munition plants it becomes essential to provide such a weight check to prevent further operations on an incomplete or defective part and to permit the immediate return of such part to the preceding operator for correction.

With the present scale it is possible to weigh at the rate of five hundred an hour or more, and indication is given not only of the weight of the shell or part but also the variance above or below the tolerance permitted for that shell or part. To maintain accuracy at this speed, however, means must be provided to limit the travel of the moving parts of the scale to a desirable minimum and to effectively cushion the shocks of impact of the shells upon the delicate weighing mechanism.

With the above and other objects in view which will readily appear as the invention is better understood, my invention consists of the novel construction, combination and arrangement of parts to be hereinafter more fully described and particularly pointed out in the appended claims.

Reference is to be had to the accompanying drawings illustrating preferred embodiments of my invention and wherein similar reference numerals designate similar parts throughout the several views.

In the drawings:—

Figure 4 is a side elevation of a modified form of platform construction;

Figure 5 is a plan view thereof;

Figure 6 is a plan view of another platform construction; and

Figure 7 is a detail section taken substantially on the line 7—7 of Figure 6.

Figure 1:
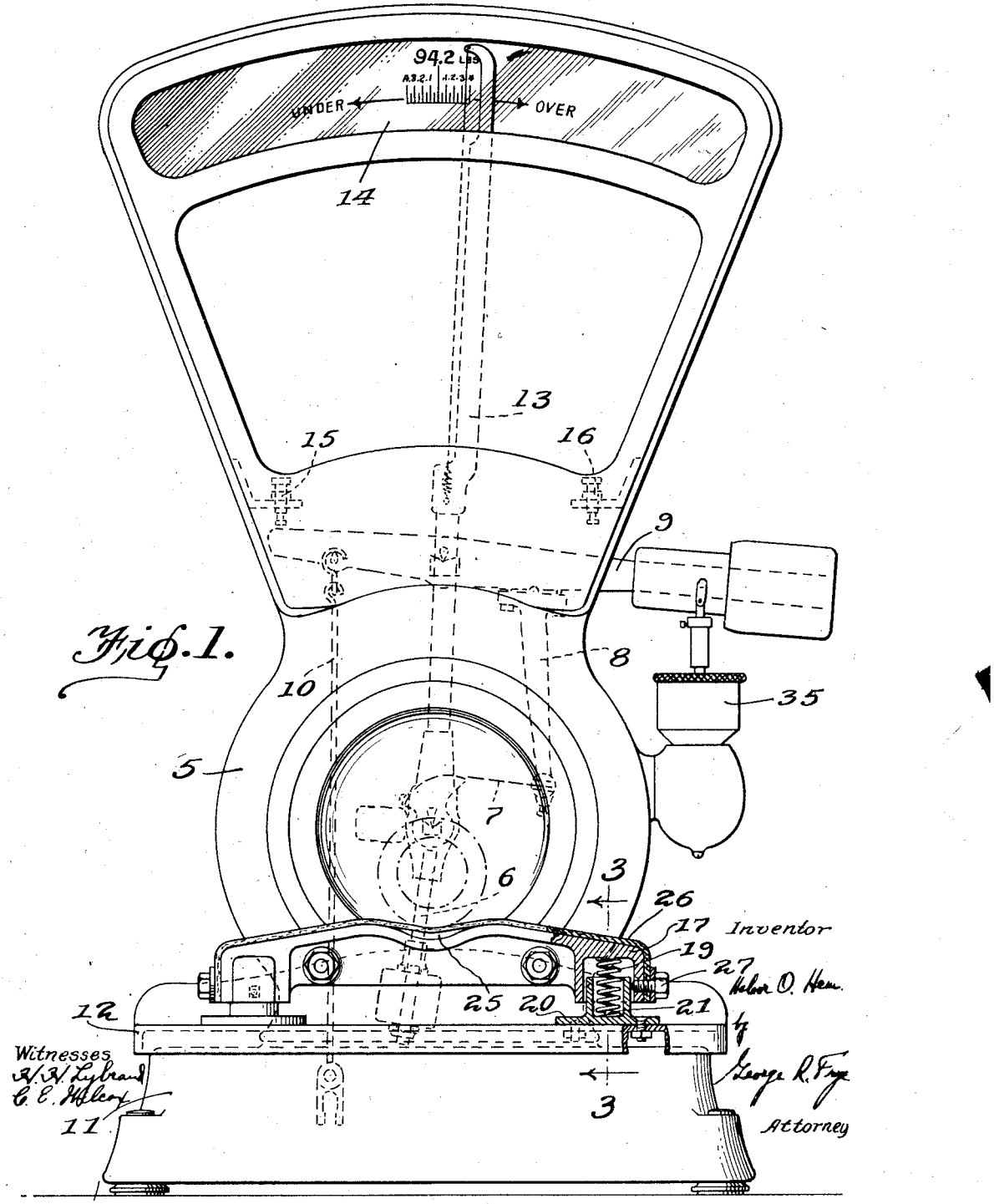
Figure 1 illustrates a front elevation, with parts in section, of a scale equipped with my improved mechanism.

In the drawings, the numeral 5 designates the casing of the scale in which is pivotally mounted the load-offsetting pendulum 6 connected through the flexible member 7 with an arm 8 depending from the main beam 9 which is connected through the steelyard rod 10 with the platform-supporting lever mechanism (not shown) contained in the base 11 and upon which the platform 12 is directly imposed. The index hand 13 is secured to the pendulum 6 and moves therewith on the same center, co-operating with the indicating chart 14 to designate the weights of the shells or parts placed upon the platform.

As will be noted from Figure 1, the graduated portion of the chart is quite limited in extent, and comprises a series of indications extending in both directions from a central graduation which is accurately placed upon the chart to show the desired weight of the shell or part being weighed, this weight being predetermined in the usual manner, and the graduations comprising the permissible plus and minus tolerances or a few graduations beyond these tolerances. To enable the most rapid operation of the scale, the movable parts thereof are limited in their movements by stops 15 and 16 adjustably mounted in brackets carried by the casing 5 adjacent the main beam, the beam contacting with one of the stops shortly after the hand has swung beyond the range of the graduations on the chart 14. Thus, there is no zero indication on the chart and the only known weighing effected is when the hand covers one of the graduations adjacent the center of the chart and the moment the hand passes beyond the range of the graduations it becomes evident that the part being weighed is not within the tolerated weight.

The operation of the weighing mechanism is as follows: When a shell or like commodity is placed upon the platform of the scale a downward pull is imparted to the steelyard rod 10, swinging that arm of the beam 9 to which it is connected downwardly and the opposite arm together with the depending member 8 upwardly, whereby through the flexible member 7 the pendulum 6 is raised a sufficient distance to offset the weight of the commodity upon the platform, the offsetting capacity of the pendulum being indicated by the index hand 13 and chart 14.

Figure 2:
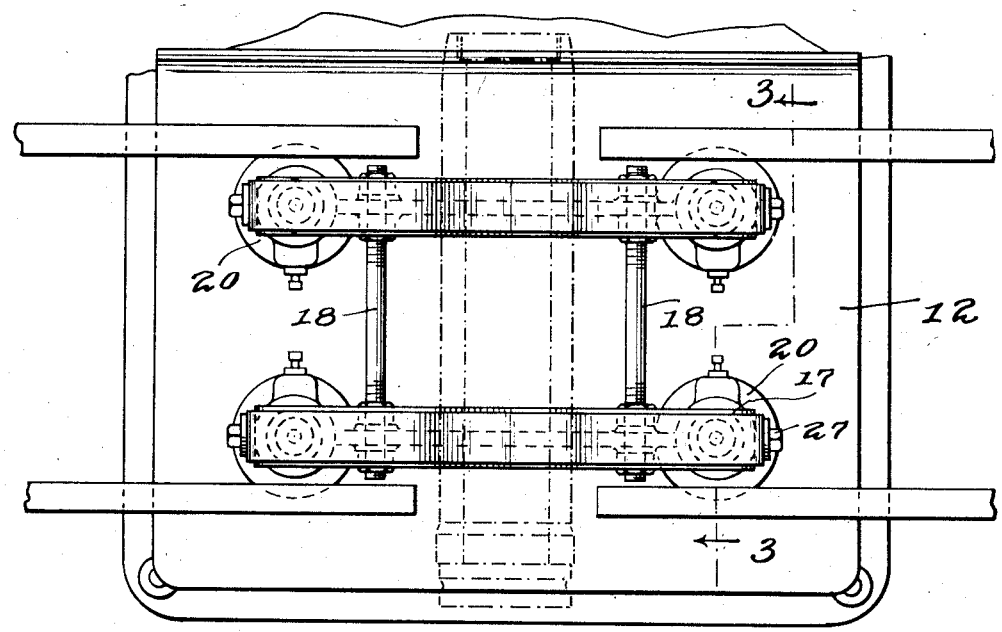
Figure 2 is a plan view of the platform and shock absorbing sections thereof.
Figure 3:
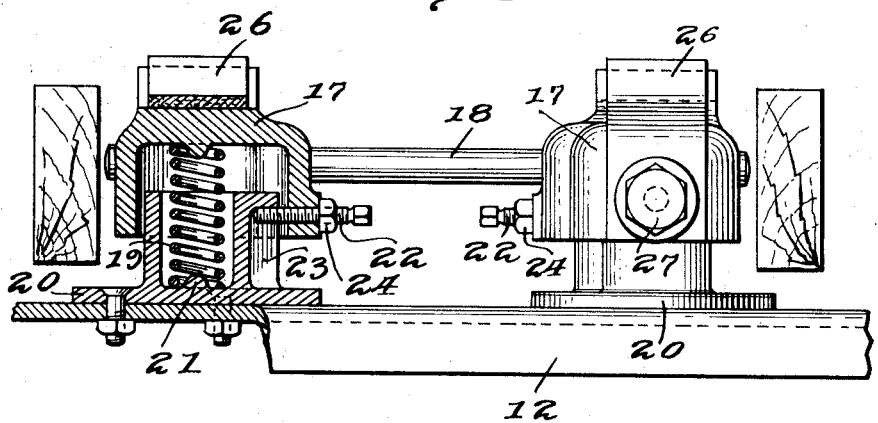
Figure 3 is a detail section taken substantially on the lines 3—3 of Figures 1 and 2.

To cushion the shocks of impact of the shells and heavy parts upon the platform a secondary or auxiliary platform is superimposed upon the platform 12 and carries shock absorbing members to prevent the transmission of the shocks to the delicate scale parts. In Figs. 1–3 I have shown the auxiliary platform as comprising a pair of rails 17 arranged parallel with the face of the chart and connected together by crossbars 18. The down-turned ends of the rails are cupped substantially as shown in Figs. 1 and 3 and receive the upper extremities of shock absorbing springs 19, the lower extremities of which rest in upwardly extending cups 20 bolted or otherwise secured upon the regular platform 12. Suitable bosses 21 are preferably arranged to position the extremities of the springs. The cups 20 extend within the cupped ends of the rails 17 a sufficient distance to form a guide for the downward movement of the rails when a shell is placed thereon, and to prevent accidental detachment of the rails from the cups 20 suitable stops are provided, as, for example, the adjustable bolts 22 (see Fig. 3) carried by the rails 17 and extending into slots 23 in the cups 20. Normally the bolts 22 engage the upper walls of the slots 23 and limit the upward movement of the rails, and when a load is imposed upon the rails the bolts move downwardly within the slots. Suitable locking nuts 24 may be provided to maintain any desired adjustment. As herein shown, the rails 17 are centrally grooved, as shown at 25 in Fig. 1, and a strap 26 of leather or similar material may be stretched lengthwise of the rails and secured adjacent each end by bolts 27. The grooves 25 form seats for the shells when in position for weighing, and also insure the proper disposition of the weight upon the weighing mechanism during the weighing operation. The straps 26 being normally spaced slightly above the upper wall of the groove 25 also serve as an additional cushioning member.

In Figs. 4 and 5 I have illustrated a modified auxiliary platform construction especially adapted for the reception of shells of such length as to require their being arranged parallel with the face of the chart during the weighing operation. This auxiliary platform comprises an upper plate 30 suitably reinforced by ribs, etc., and centrally grooved substantially as shown in Fig. 4. Adjacent each corner the plate 30 is provided with downwardly extending lugs 31 in which are secured the upper extremities of bolts 32 extending through apertures in the regular platform 12. Suitable shock absorbing springs 33 surround the bolts 32 and prevent the transmission of the shocks of impact of shells upon the auxiliary platform to the platform lever mechanism. The springs 33 may be compressed to any desired degree before the shells are impinged upon the platform 30 by rotating the nuts 34 which bear against the lower surface of the main platform 12, thus drawing downwardly the bolts 32 and auxiliary platform and compressing the springs 33. Suitable lock nuts 35 serve to hold the nuts 34 to maintain any desired adjustment.

In Figs. 6 and 7 is shown an auxiliary platform construction substantially similar to that illustrated in Figs. 4 and 5 but without the central groove, this construction being particularly adapted for weighing shells, etc. which are of sufficient diameter to be stood on end during the weighing operation. This auxiliary platform includes an upper plate 30$^a$ with its upper surface substantially level and provided with depending lugs 31$^a$ in which are threaded the upper extremities of bolts 32$^a$, the lower extremities of which pass through apertures in the regular platform 12, suitable cushioning springs 33$^a$ surrounding the bolts. The upper extremities 32$^a$ are secured in position in the lugs 31$^a$ by set screws, and suitable adjusting and locking nuts are utilized to compress the springs 33$^a$ to any desired degree.

The operation of the scale is believed to be apparent from the foregoing description. The shells or similar parts are rapidly brought to the scale on a conveyor system or the like and are then imposed upon the auxiliary platform, the shock of their impact being absorbed by the auxiliary platform shock absorbing mechanism before it is transmitted to the delicate lever and pendulum mechanisms by which it is weighed. The weighing is effected rapidly owing to the small travel of the moving parts of the scale, and as soon as the index hand stops over one of the graduations of the chart the weight of the shell is marked thereon or on an accompanying card, or if the hand comes to rest beyond the graduated portion of the chart the shell is marked with a distinguishing color or immediately thrown out of the travel.

A dash pot 35 may also be connected with the lever 9 or other moving part of the scale to dampen the movements of the weighing mechanism.

While it will be apparent that the illustrated embodiments of my invention herein disclosed are well calculated to adequately fulfill the objects primarily stated, it is to be understood that the invention is susceptible to variation, modification and change without departing from the spirit and scope of the invention as set forth in the subjoined claims.

Having described my invention, I claim:

1. In a weighing scale, in combination, a main platform, an auxiliary platform resiliently mounted thereon, and means for placing the resilient mounting of the auxiliary platform under adjustable tension.

2. In a scale of the character described, a main platform, an auxiliary platform superimposed on said platform, shock absorbing members arranged to normally support the auxiliary platform from the main platform and means for placing the shock-absorbing members under adjustable tension.

3. In a scale of the character described, a main platform, an auxiliary platform superimposed on said platform, shock absorbing members arranged between the two platforms to normally support the auxiliary platform from the main platform and means for placing the shock-absorbing members under adjustable tension.

4. In a scale of the character described, a main platform, an auxiliary platform superimposed on said platform, and shock absorbing members arranged to normally support the auxiliary platform from the main platform, said auxiliary platform being provided with cupped down-turned ends adapted to receive the upper extremities of the shock absorbing members.

5. In a scale of the character described, a main platform, having spaced upwardly-extending cups mounted thereon, an auxiliary platform arranged above the main platform and provided with cupped down-turned portions, and shock absorbing springs arranged within the cupped portions of the main and auxiliary platforms to resiliently support the auxiliary platform from the main platform.

6. In a scale of the character described, a main platform, having spaced upwardly-extending cups mounted thereon, an auxiliary platform arranged above the main platform and provided with cupped down-turned portions, and shock absorbing springs arranged within the cupped portions of the main and auxiliary platforms to resiliently support the auxiliary platform from the main platform, said auxiliary platform being centrally grooved to position the commodity being weighed.

7. In a scale of the character described, a main platform having spaced upwardly-extending cups mounted thereon, an auxiliary platform arranged above the main platform and provided with cupped down-turned portions, shock absorbing springs arranged within the cupped portions of the main and auxiliary platforms to resiliently support the auxiliary platform from the main platform, and means for limiting the upward movement of the auxiliary platform.

8. In a scale of the character described, a main platform, an auxiliary platform superimposed on the main platform and comprising a pair of rails secured to each other and provided with grooves intermediate their ends, a strap disposed lengthwise of each rail and secured at the extremity thereof, and means for resiliently supporting the auxiliary platform from the main platform.

9. In a scale of the character described, a main platform, an auxiliary platform superimposed on the main platform and comprising a pair of rails secured to each other, the rails being formed with cupped down-turned portions adjacent their ends, and means extending into said cupped portions for resiliently supporting the auxiliary platform from the main platform.

10. In a scale of the character described, a main platform, an auxiliary platform superimposed on the main platform and comprising a pair of rails secured to each other, the rails being formed with cupped down-turned portions adjacent their ends, a strap disposed lengthwise of each rail and secured at the extremities thereof, and means for resiliently supporting the auxiliary platform from the main platform.

11. In a scale of the character described, a main platform, an auxiliary platform superimposed thereon, shock absorbing members arranged between the two platforms to normally support the auxiliary platform from the main platform, and means for adjusting the resistance offered by said shock absorbing members to the lowering of the auxiliary platform.

12. In a scale of the character described, a main platform, an auxiliary platform having apertures superimposed thereon, shock absorbing members arranged between the two platforms to normally support the auxiliary platform from the main platform, and means for adjusting the resistance offered by said shock absorbing members to the lowering of the auxiliary platform, comprising bolts secured to the auxiliary platform and extending through the apertures in the main platform, coil springs surrounding said bolts between the two platforms, and adjusting nuts arranged on said bolts in contact with the lower surface of the main platform.

13. In a scale of the character described, in combination, a platform, an auxiliary commodity-receiver on said platform, said auxiliary commodity-receiver having a depression therein and a flexible member secured at its ends to said auxiliary commodity-receiver and extending across said depression.

14. In a scale of the character described, a commodity-receiver having a depression therein, and a flexible member secured at its ends to said auxiliary commodity-receiver and extending across said depression.

15. In a scale of the class described, a commodity-receiver comprising, in combination, a pair of rails, said rails having depressions therein, and straps extending across said depressions.

HALVOR O. HEM.

Witnesses:
GEORGE R. FRYE,
FRANCES C. DAYLE.